F. HUOT.
REFINING PETROLEUM.
No. 63,051. Patented Mar. 19, 1867.
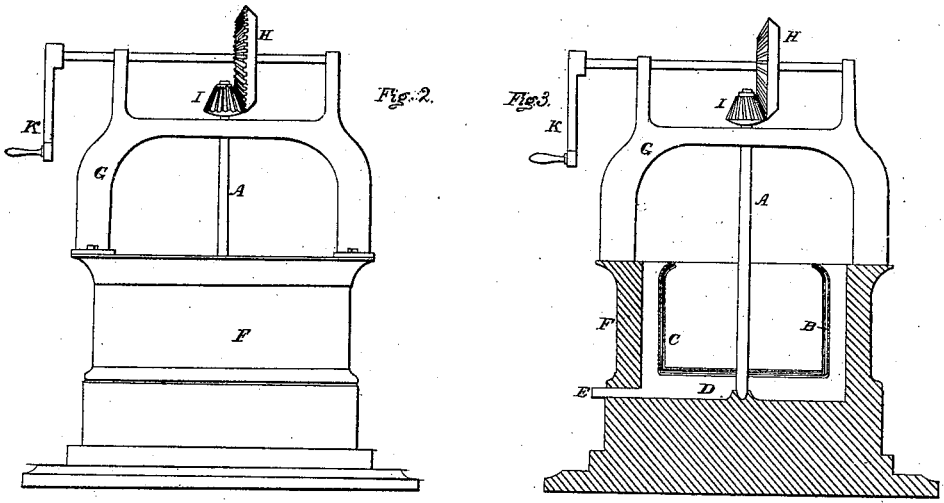
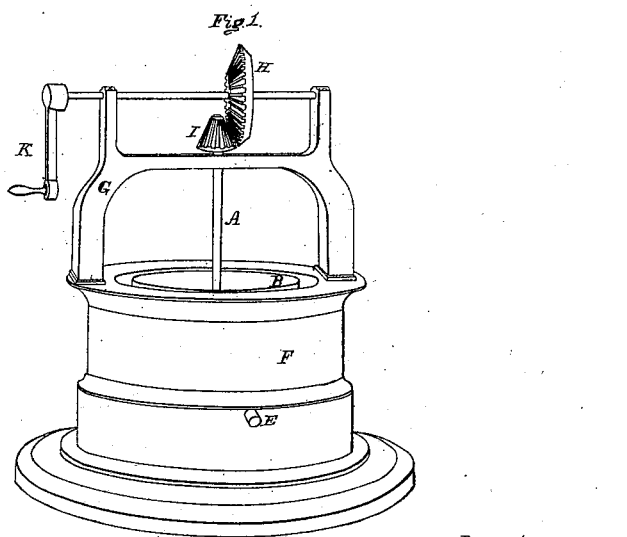
Witnesses:
Chas H Smith
Geo. D Walker
Inventor:
Henry Huot

United States Patent Office.

FLEURY HUOT, OF PERTH AMBOY, NEW JERSEY, ASSIGNOR TO HIMSELF AND JOHN ROGERS, OF NEW YORK CITY.

Letters Patent No. 63,051, dated March 19. 1867; antedated September 19, 1866.

---

IMPROVEMENT IN REFINING PETROLEUM, &c.

---

The Schedule referred to in these Letters Patent and making part of the same.

---

TO ALL WHOM IT MAY CONCERN:

Be it known that I, FLEURY HUOT, of Perth Amboy, in the county of Middlesex, and State of New Jersey, have invented, made, and applied to use, a certain new and useful Improvement in Refining and Purifying Petroleum and similar oils; and I do hereby declare the following to be a full, clear, and exact description of the said invention, reference being had to the annexed drawing, making part of this specification, wherein—

Figure 1 is a perspective view of the apparatus employed by me.

Figure 2 is an elevation thereof; and

Figure 3 is a vertical section of the same.

Similar marks of reference denote the same parts.

The object of my invention is to remove the light hydrocarbons and the coloring matter from petroleum and similar oils, so as to render the same colorless and inodorous. The nature of my said invention consists in the employment of bone-black for removing the coloring matter from petroleum, and absorbing the light hydrocarbon which it contains, or which is formed during the distillation of said oil. I make use of a centrifugal filter for separating the oil from the bone-black, the coloring matter and the light hydrocarbon remaining with the bone-black, or the remaining portion of the light hydrocarbon being evaporated from the oil as the same is thrown off through the air in the form of fine spray, the air at the same time receiving a motion from such centrifugal filter. I make my filtering medium of two thicknesses of woollen or other cloth made in the shape of the centrifugal apparatus, and sustained by the woven wire forming the cylinder thereof; and between these two thicknesses of cloth I introduce sheets of filtering paper similar to that used in chemical laboratories.

A is the shaft sustained in the frame G at the top, and at the bottom the shaft sets in a step within the casing F. H is a gear-wheel rotated by the crank K, or other competent power, and communicating a rapid rotation to the shaft A through the pinion I. Upon the shaft A is a cylindrical vessel, B, formed of wire grating, and containing within it a double bag of cotton or woollen material, as at C, and between the two thicknesses of these bags the sheets of filtering paper are placed. The double bags are shown at C by the black lines on each side of the red line, which shows the filtering paper. The oil and bone-black are supplied into this vessel B while the same is rotated with great velocity; the oil is thrown off through the filtering paper and wire grating into the chamber D, and runs away by the pipe E, the bone-black and impurities being retained. The oil, if it contains but little of impurities, may be simply filtered through bone-black within the centrifugal filter C B.

What I claim, and desire to secure by Letters Patent, is—

1. I claim separating the bone-black and impurities from the oil by filtering the same through a centrifugal filter as specified.

2. I claim the centrifugal filter formed of two thicknesses of cloth with sheets of filtering paper between them, as and for the purposes set forth.

In witness whereof I have hereunto set my signature this 24th day of August, A. D. 1866.

FLEURY HUOT.

Witnesses:
 CHAS. H. SMITH,
 GEO. D. WALKER.